T. V. HANDLOSER & J. C. DILWORTH.
METHOD OF POINTING TIE PLATE CLAWS.
APPLICATION FILED AUG. 3, 1910.

1,021,520.

Patented Mar. 26, 1912.

WITNESSES

INVENTORS

UNITED STATES PATENT OFFICE.

THOMAS V. HANDLOSER AND JOHN C. DILWORTH, OF PITTSBURGH, PENNSYLVANIA, ASSIGNORS TO DILWORTH, PORTER & COMPANY, LIMITED, OF PITTSBURGH, PENNSYLVANIA, A PARTNERSHIP.

METHOD OF POINTING TIE-PLATE CLAWS.

1,021,520.  Specification of Letters Patent.  Patented Mar. 26, 1912.

Application filed August 3, 1910. Serial No. 575,361.

*To all whom it may concern:*

Be it known that we, THOMAS V. HANDLOSER and JOHN C. DILWORTH, both of Pittsburgh, Allegheny county, Pennsylvania, have invented a new and useful Method of Pointing Tie-Plate Claws, of which the following is a full, clear, and exact description, reference being had to the accompanying drawings, forming part of this specification, in which—

Figure 1:
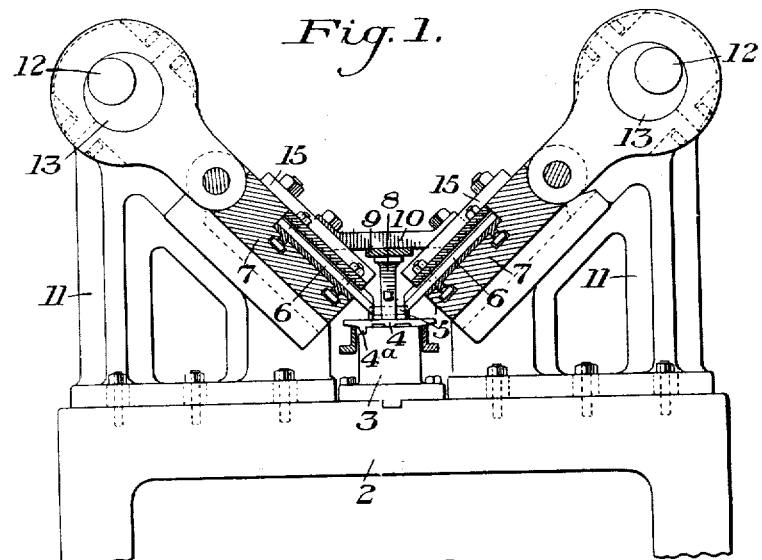
Figure 2:
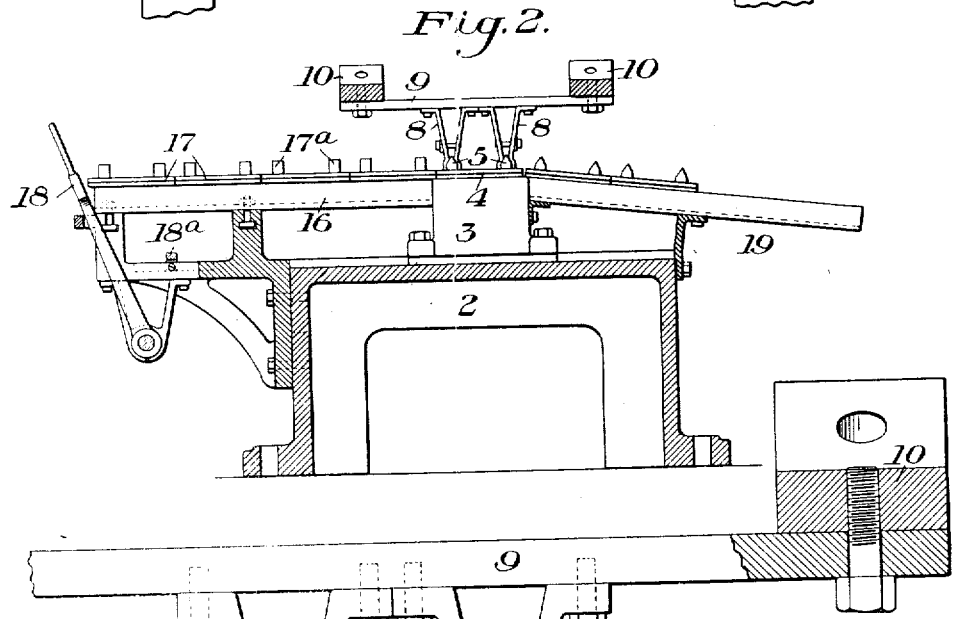
Figure 3:
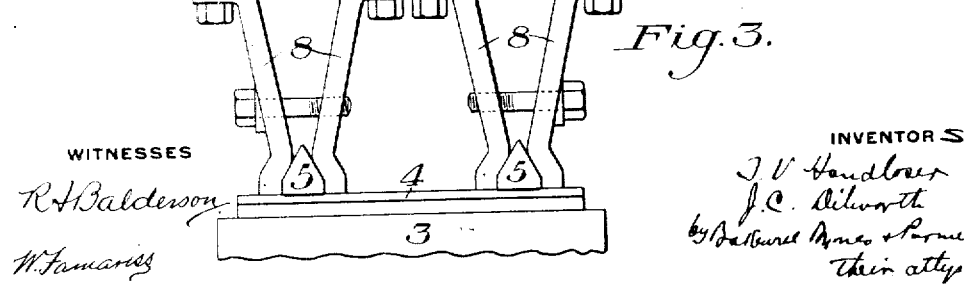

Figure 1 is a sectional side elevation of the machine, showing the reciprocating dies secured in the plunger in their operative position; Fig. 2 is a transverse section showing more clearly the hold-down device for the male dies and the plate-feeding devices: and Fig. 3 is a detail view on a larger scale showing more clearly the hold-down devices.

Our invention relates to the pointing of tie plate claws, and is designed to provide a new and improved method therefor by which these claws may be sharpened or provided with a knife edge where such claws are located at a considerable distance inside the edge of the plate. Heretofore it has been necessary to place these claws at or near the side edges of the plate, because the shearing devices which pointed and cut the claws at an angle operated by a forward movement past the plate body and away from said body in the shearing movement. Consequently, in order to rotate the body of the claws for cutting, the claws must be placed near the edges of the plates.

We have discovered that by moving the cutting die or dies toward the plate in their cutting movement, we can cut and point the claws wherever located on the plate. It is highly desirable to place these claws at a considerable distance from the side edges of the plates in order to bring them under the rail base, and hence, our invention is of great importance since it allows this location for the claws while providing for properly cutting and pointing them.

In the drawings, in which we show one form of apparatus for carrying out our invention, 2 represents the base plate of the machine, having adjustably secured thereto a block 3 on which the tie plate rests in a horizontal position during the cutting operation. The block 3 is longitudinally recessed to receive the shoulder or shoulders $4^a$ on the top surface of the tie plate 4. The tie plate lies upside down on this support with its claws projecting upwardly.

The cutting is performed by sets of dies 5 and 6, of which the male dies 5 are stationary and are suspended above the block 3, while the dies 6 are secured to inwardly movable plungers 7, which have a reciprocating movement imparted through any suitable connections. These dies are male and female, and as the female dies operate at an angle to the claws in their forward movement toward the plate body, they point the claw and at the same time shear the edges on an angle so as to give a knife edge at the outer side of each claw. The male dies 5 are held between clamping members 8, which are adjustably secured to a longitudinal bar 9, extending from the front to the rear of the machine and having its ends secured to transverse struts 10, connecting the adjustable angle side frames 11 at the front and rear of the machine. These side frames 11 adjust back and forth toward each other on the base 2, and carry the shafts 12 for eccentrics 13, connected to the plungers 7 for the other dies 6.

15 are hold-down plates for the plungers, which plungers are suitably recessed to receive the die holders for the dies 6. The dies 6 are recessed to fit over the ends of the male dies, as the plungers are reciprocated at an angle to the plate.

We prefer to feed the plates in a row from the angle bars 16 extending forwardly from the block 3, the row of plates 17 with their rectangular claws $17^a$ projecting upwardly being fed along the bars by an oscillating lever 18. The stroke of this lever is preferably regulated by an adjustable stop $18^a$, and at each stroke, the row of plates is fed forward the length of one plate. The operator times the stroke of his lever with the stroke of the plungers and feeds in one plate at the back of the row on each back stroke of the lever. The plates pushed from the block 3 drop on a gravity skid 19, the plates being finished by this pointing operation. The operation not only points the plate, but gives a knife-edge at the inner surface of the claws and at each side edge.

We prefer to hold the plate in a horizontal position during the operation, though it may be held in other positions; because this provides for endwise feed of the plates, which can be laid abutting each other and thus feed each other along by endwise pushers, so that hand-feeding is avoided. Suitable stops are provided for holding each plate in the desired position for the pointing operation.

The advantages of our invention will be apparent to those skilled in the art, since it enables the sheared claws to be used at points removed from the side edges of the plate; while heretofore they could not be sheared in such location.

Many variations may be made in the machine for carrying out our invention, since we consider ourselves the first to shear these claws by a movement of the cutter or die toward the body of the plate as distinguished from moving the cutter or die away from the plate during its cutting movement.

We claim:—

1. The method of pointing tie plate claws which project substantially at right angles to the plate body, consisting in moving a cutter or die at an oblique angle to the claw and toward the plate during the cutting operation, substantially as described.

2. The method of cutting tie plate claws, projecting substantially at right angles from the plate body, consisting in moving a cutter or die in conjunction with the claw in a path at an oblique angle to the claw and toward the body of the plate away from the end of the claw during the cutting movement, substantially as described.

3. The method of cutting tie plate claws projecting substantially at right angles to a plate body, consisting in holding the claw against one die and moving another die in contact with the claw at an oblique angle thereto and in a direction toward the plate and away from the end of the claw during the cutting operation, substantially as described.

In testimony whereof, we have hereunto set our hands.

THOS. V. HANDLOSER.
JOHN C. DILWORTH.

Witnesses:
C. P. BYRNES,
H. M. CORWIN.

Copies of this patent may be obtained for five cents each, by addressing the "Commissioner of Patents, Washington, D. C."